Nov. 18, 1947. C. E. MUNSON 2,431,192
DISPENSING DEVICE
Filed Sept. 14, 1944

INVENTOR.
CHARLES E. MUNSON
BY
*Hoguet Neegy Campbell*
HIS ATTORNEYS

Patented Nov. 18, 1947

2,431,192

UNITED STATES PATENT OFFICE 2,431,192

DISPENSING DEVICE

Charles E. Munson, Summit, N. J.

Application September 14, 1944, Serial No. 553,985

4 Claims. (Cl. 222—209)

1

The present invention relates to measuring or dispensing devices for liquids, semi-liquids and other suitable flowable materials; and more particularly to a device of the general character specified which is adapted for use with a bottle or other suitable container and from which a measured amount of the material may be dispensed. The discharge of flowable material from the device may be effected conveniently while the container is in an inverted position and out of view of the user.

In the dispensing devices adapted for operation to apply drops of liquid in the eye or in the nose for treatment thereof, it is difficult if not impossible for a person, in applying medication to the nose, eye or ear, for example, to ascertain how many drops have been dispensed, because the outlet is in such a position with reference to the eye that the drops can not be observed and counted. The ordinary so-called "eye dropper" comprising a tube tapered at one end and having a bulb on the other end, may be taken as an example of such a dispenser.

In using certain solutions it is important to avoid an overdosage, but despite this it is quite common to administer an overdosage because the person applying it can not see how much is being squeezed from the dropper, a condition which almost always exists during treatment of a person by himself and in many cases when the observer is treating another. Difficulties of the same general character are encountered when flowable material is dispensed by a dispensing device attached to the container for dispensing the material received directly therefrom.

In the case of many medicines, such as certain nose drops, it is highly important to avoid an overdose as the excess administration of the material is injurious. When such medicines are applied by the user, he usually "squirts" what he thinks is the required number of drops, but the layman's idea of such quantities is not accurate and he usually errs on the generous side. As a result, he administers an overdose.

It is an object of my invention to provide a device by which a measured amount of a liquid—and no more—can be readily administered without visual control.

Another important object of the invention is to provide a novel and advantageous device of the general character specified which can be produced easily and economically and can readily be fastened to bottles and other suitable containers as by means of screw threads on the necks of the bottles and other containers.

2

Still another object is to provide novel and advantageous devices of the character specified, each of which comprises a passage enclosed at one part by a bulb which when the device is filled by inverting the container, may be compressed to dispense flowable matter received from the container, up to a predetermined amount limited by means to prevent further compression of the bulb.

An additional object is to provide a device of the character specified, comprising a duct having a perforated intermediate portion enclosed in a bulb whereby the volume of flowable material discharged by one compression of the bulb cannot be greater than the volume of the space between said perforated intermediate portion and the bulb.

Another object is to provide novel and advantageous devices of the character specified, each of which comprises a duct enclosed at one part by a bulb in communication with the interior of the duct, a bulb-compressing device and means for limiting the action of the bulb-compressing device and therefore the quantity of material discharged from the dispensing device.

A further object is to provide a dispensing device comprising a part actuated to discharge material to be dispensed, adjusting means to limit the action of said part, and an indicator for use in setting said adjusting means to determine the maximum volume of material discharged at each operation of said part.

Further objects, features and advantages will appear upon consideration of the following detailed description of preferred embodiments illustrating the invention and in connection with the drawings, in which.

Figure 1:
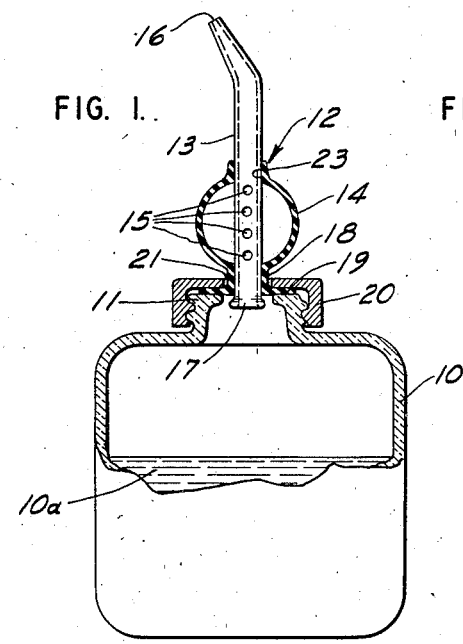
Fig. 1 is a view in elevation illustrating a bottle having attached thereto a dispensing device embodying one form of the present invention, part of the bottle being broken away to provide a better view.

Referring to the drawings there is illustrated in Fig. 1 a bottle 10, containing a liquid 10a, and having a screw-threaded neck 11 to which is attached a dispensing device generally shown at 12 embodying one form of the invention and comprising a spout or dispensing tube 13 and a bulb or hollow ball 14 of rubber or other suitable flexible and elastic material enclosing a portion of the tube 13 having one or more perforations or holes 15 large enough for the material to flow freely therethrough. The dispensing tube 13 while preferably a glass tube, may be made of any suitable rigid or semi-rigid material, such as plastic or metal, and may be straight, or bent to meet some particular requirement. At its delivery end or outlet the spout 13 has an outlet or opening 16 which is preferably smaller than the inside diameter of the body of the spout, and at its other end it is provided with an enlarged portion or flange 17. The spout 13, except for the hole or holes 15, may be similar to the glass portion of the ordinary so-called "eye-dropper."

The bulb 14 may have an extension in the form of a tubular extension or tube 18 provided at its end with a flange 19 adapted to seat upon the end of the neck 11 of the bottle, and may be secured to the neck of the bottle by means of a screw cap 20 adapted to screw on the neck 11 and having in its top a hole or opening 21 in which the tube 18 will fit and through which the flange 19 when in compressed form may be passed in advance of said tube or tubular portion 18. At the side of the bulb opposite to the flanged end thereof there is an opening 23 just large enough to permit the spout 13 to fit snugly therein.

After the bulb 14 and screw cap 20 have been assembled as indicated in Fig. 1, the tube or spout 13 may be inserted into the flanged end of tube 18 and passed through said tube 18 and bulb 14 until the flange 17 of the spout is brought close to the flanged end of tube 18 where it will prevent further outward movement of the spout and will aid in maintaining the proper positioning of the bulb around the portion of the spout 13 having the openings 15. When the cap 20 is screwed down on the neck 11 the flange 19 serves as a gasket to seal the connection between the bottle 10 and the dispensing device.

Figure 3:
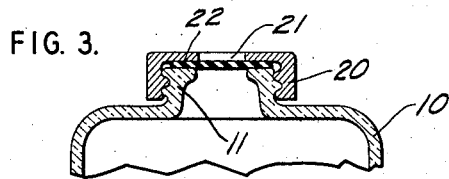
Fig. 3 is a fragmentary sectional view of the upper part of the bottle without the dispensing device but with the bottle neck closed by a removable disc and a screw cap with a central opening.

When not in use with the dispensing device, the screw cap 20 may be equipped with a disc 22 of rubber, cork, or other suitable material to close the central opening 21, and used to seal the neck of a bottle 10, as shown in Fig. 3. In this manner the screw cap 20 may serve the purpose of closing the bottle when it is packaged apart from the dispensing device and also as a means for attaching the dispensing means to the bottle.

In some cases it may be desirable to package or market the bottle without the dispensing means attached thereto or to detach the dispensing means from the bottle for long periods between use. Also, the dispensing means may be marketed separately for use with various sized bottles and the screw cap 20 may be made in various sizes or with various fastening means to fit various bottles.

Figure 2:
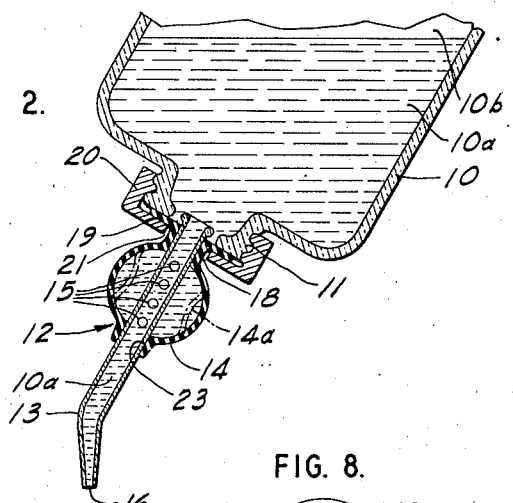
Fig. 2 is a view in elevation of the structure in Fig. 1 but with the bottle in inverted position.

When the container or bottle 10 of the apparatus illustrated in Figs. 1, 2 and 3 contains a fluid or liquid, such as a solution for medication, and is inverted, as shown in Fig. 2, the liquid flows into the spout 13 and from the spout through openings 15 into the bulb 14. All air not forced out through outlet 16 passes upwardly to the upper part of the inverted bottle in the space indicated at 10b above the level of the liquid 10a. At this time spout 13 is completely filled but the liquid does not flow out of outlet 16 due to the small size thereof and the capillary forces in the liquid. The size of the opening 16 may be made or adjusted with reference to the surface tension and viscosity characteristics of the liquid, if necessary.

When it is desired to dispense the liquid, the additional pressure necessary to make the liquid flow from outlet 16 (Fig. 2) may be provided by compressing the bulb 14 from opposite sides as, for example, between the thumb and forefinger of one hand. The bulb walls are shown in dotted lines 14a in intermediate positions. Such movement of the bulb walls will force fluid from the interior of the bulb through the openings 15 into the spout 13 and, inasmuch as fluid or liquid follows the line of least resistance, the liquid will be forced downwardly and out of the outlet 16. The forces are not such as to compress the air 10b entrapped in the upper part of the bottle. In order to get a definite measured discharge, the pressure must be applied until the walls of the bulb at the opposite points of applied pressure engage the surface of the spout 13. The walls of the bulb, being very flexible, are easily compressed by the slightest pressure until they touch the spout.

The amount of fluid dispensed at one compression of the bulb 14 is governed primarily by the size of the bulb and to a much lesser extent by the area to which pressure is applied on the outer surface of the bulb. The latter factor may be somewhat variable, but in practice the normal operation by the thumb and finger of the user is substantially the same and results in dispensing an equal amount or at least an amount within an error of less than one drop. In no case, however, will it be possible by a single squeeze of the bulb to dispense more of the liquid than the volume represented by the decrease in the bulb capacity upon compression thereof, since the bulb cannot be compressed beyond the stage at which opposite sides of the bulb come into contact with the spout which must be of sufficient strength to prevent breakage.

The spout 13 and the bulb 14 which partially covers the spout may be made of any size within the limits of practicability. Furthermore, bulbs of different size may be used on the same spout. In such cases it might be convenient to use bulbs in the form of balls, in that the volume at the interior of a ball can be so easily calculated. A plurality of interchangeable bulbs 14 may be provided of different sizes for dispensing different amounts of liquid. This is especially feasible when the embodiments shown in Figs. 4 and 5 are used where the different bulbs 14 can simply be slipped on and off the spout 13.

Release of finger-thumb pressure while the apparatus is in dispensing position (Fig. 2) and reapplication of pressure will permit a duplicate amount of material to be dispensed, since air will be drawn in through the spout, equal in volume to the liquid dispensed, and will find its way to the space 10b.

Figure 8:
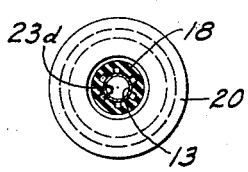
Fig. 8 is a view taken along the line 8—8 of Fig. 6.

Upon restoring the apparatus to an upright position, the excess of fluid which was not forced out of the discharge opening or outlet 16 flows back or returns to the bottle. In order that the bulb 14 may be completely drained upon restoration of the bottle 10 to upright position, the lowermost hole or holes 15 (Fig. 1) preferably should be at or near the bottom of the bulb chamber. Drainage from the bulb to the bottle may also be facilitated by providing the interior of the tubular extension 18 of the bulb 14 with one or more longitudinal grooves 23, as shown in Fig. 8.

Figure 4:
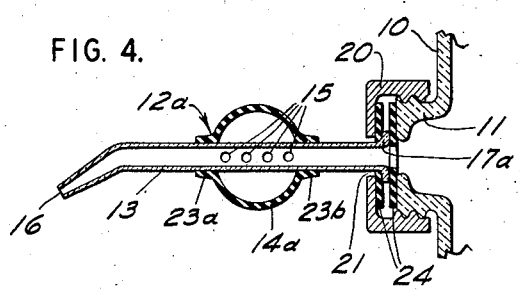
Fig. 4 is a view partly in section illustrating a second or modified form of dispensing device and modified means for attaching it to the bottle.
Figure 5:
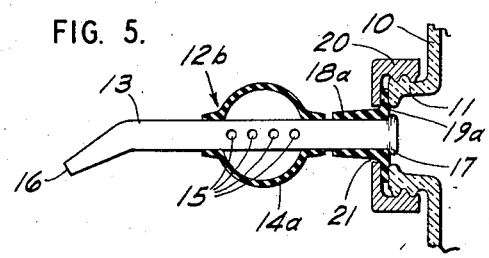
Fig. 5 is a view partly in section illustrating a third form.

In Fig. 4 there is illustrated an embodiment in which the tubular extension 18 of the bulb 14 and the flange 19, shown in Fig. 1, are omitted and the flange 17a, corresponding to flange 17 of Fig. 1 but somewhat larger in diameter, is used between two washers 24 which in turn are clamped between the annular top of screw cap 20 and the neck 11 of the bottle. Each end of the bulb 14 has an opening 23a and 23b which adapts the bulb to fit snugly over the spout. One of the important advantages of bulbs in the form shown at 14a is that they can readily be changed to accord with various amounts of flowable material to be dispensed by a single compression of the bulb 14a, as suggested previously. This form of dispenser can be readily assembled or taken apart.

In Fig. 5, there is shown a form which is similar in most respects to that of Fig. 4 but differs therefrom in the manner in which the spout 13 is attached to the bottle, and is also similar to the structure shown in Fig. 1, the principal difference being that the tubular extension 18a and flange 19a are separated from the bulb instead of being connected thereto as in Fig. 1. This arrangement obviously also facilitates a change of bulbs when desired.

In the embodiments of the invention illustrated in Figs. 1 through 6, any spout and its bulb may be so designed as to determine with substantial accuracy what volume of material, for example in drops or cubic centimeters, will be discharged by a thumb-finger compression of the bulb against the spout. Of course smaller amounts of material could be discharged by compressing the bulb to a lesser extent. The bulb may be shaped so as to be spheroidal, square, rectangular, or may have any suitable shape. It may be formed of any elastic material, or may be formed of non-elastic flexible material if other means, such as springs between the spout and the bulb, are used to return the bulb to normal expanded position.

Figure 7:
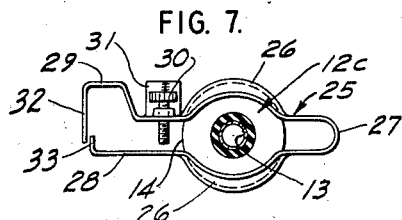
Fig. 7 is a section taken along the line 7—7 of Fig. 6.

In Figs. 7 and 8 there is illustrated an embodiment of the present invention in which the holes 15 are replaced by grooves 23d and in which the operator compresses a device which in turn compresses the bulb, the extent of the compression of such device being adjustable and the corresponding volumes indicated on a scale. To the latter end, provision is made of a compression device indicated generally at 25 comprising two inwardly concave parts 26 fitting over the bulb 14 at opposite sides thereover and held against and on the bulb by suitable means such as a U-shaped spring 27 which may be integral with said concave parts 26. At the side of the bulb opposite the spring 21 one of the parts 26 is provided with an extension or finger piece 28 and the other part 26 is provided with an extension or finger piece 29 provided with a screw 30 adjustable to limit the movement of finger pieces 28 and 29 toward each other and thus the compression of bulb 14. The finger piece 29 is provided with a scale 31 adjacent to the head of screw 30 and provided with graduations to indicate, for different positions of the head of the screw, the number of cubic centimeters of material to be discharged by pressing finger pieces 28 and 29 toward each other until screw 30 engages finger piece 28.

The device also may be provided with a scale 32 having suitable graduations marked thereon and which, coacting with the extension 33, indicates the extent of the compression. This may be included in addition to the scale 31 or as an alternative.

Figure 6:
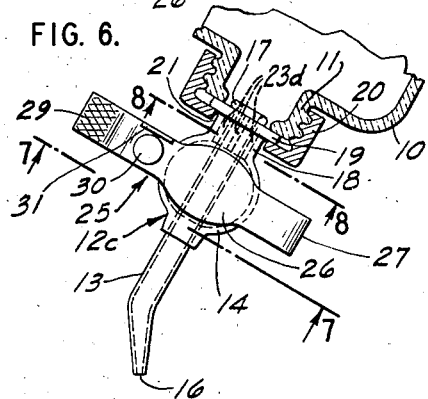
Fig. 6 is a view similar to Fig. 2 but of a fourth form.

The bulb used in the embodiment shown in Fig. 6 may be formed or attached in any of the ways indicated heretofore and the spout may be fastened to the bottle by any manner previously described.

In the embodiment shown in Figs. 6 and 8, instead of having holes 15 in the spout (as shown in Fig. 1) the tubular extension 18 of the bulb 14 is provided with one or more longitudinal grooves 23d extending from inside of the bottle 10 to the interior of the bulb. Alternatively the grooves may be formed in the outer surface of the spout enclosed in the rearwardly extending portion of the bulb 18 connecting the bulb to the container. This permits the liquid in the bottle to reach the space within the bulb. When the dispensing device is inverted and the bulb 18 is compressed, the pressure imparted to the fluid in the bulb 18 is transmitted through the passages 23d to the liquid in the container 10. Since fluids tend to follow the route of least resistance, this pressure will cause a flow of fluid from the container through the tube to the delivery end of the spout 13. Any other construction which accomplishes this function can be used. Thus the spout can be formed in two separate pieces, one piece leading from the bottle to one end of the bulb and the other piece leading from the other end of the bulb to the discharge opening.

Although the dispensing devices disclosed as embodiments of the present invention have been described with particular reference to the dispensing of liquids in suitable portions, it should be understood that such devices may be used with other freely flowing material such as sugar, sand, etc.

It should be understood that various changes may be made and that certain features may be used without others, without departing from the true scope and spirit of the invention as expressed in the following claims.

I claim:

1. A dispensing device adapted to be attached to a container comprising a spout tube having an outlet end, and an inlet end adapted to be secured to said container, and a perforated intermediate portion; and a compressible bulb enclosing said perforated intermediate portion of the tube.

2. A dispensing device adapted to be attached to a container comprising a spout tube having an outlet end, and an inlet adapted to be secured to said container, and a perforated intermediate portion; and a compressible bulb enclosing said perforated intermediate portion of said tube, said bulb having a rearwardly extending tubular portion provided with a flange at its rear end for attachment to the neck of said container and said inlet end of said spout tube being adapted to be secured to said container by means of said flange.

3. A dispensing device adapted to be attached to a container comprising a spout tube having an outlet end, an inlet end adapted to be secured to the neck of said container, and a perforated intermediate portion; a compressible bulb enclosing said perforated intermediate portion of said spout tube, said spout tube being provided with a flange at its inlet end, a cap for said neck of said container having a central opening receiving said spout tube and adapted to cooperate with said neck and gasket means to clamp said flange against said neck.

4. A dispensing device adapted to be attached to a container comprising a spout tube having an outlet end, an inlet end adapted to be secured to the neck of said container, and a perforated intermediate portion; a compressible bulb enclosing said perforated intermediate portion of said spout tube, and a tube of flexible elastic material fitted snugly on said inlet end of said spout tube and provided at its inner end with a flange to be clamped against the end of said neck of said container.

CHARLES E. MUNSON.

REFERENCES CITED

The following references are of record in the file of this patent:

UNITED STATES PATENTS

| Number | Name | Date |
| --- | --- | --- |
| 147,909 | Curtiss | Feb. 24, 1874 |
| 296,435 | Murdock | Apr. 8, 1884 |
| 487,088 | Cooley | Nov. 29, 1892 |
| 910,955 | Rickert | Jan. 26, 1909 |
| 1,004,103 | Tacey | Sept. 26, 1911 |
| 1,404,481 | Sadler | Jan. 24, 1922 |
| 2,277,936 | Rosenblatt | Mar. 31, 1942 |
| 2,339,870 | Mathis | Jan. 25, 1944 |